(12) United States Patent
Yang et al.

(10) Patent No.: US 9,844,742 B2
(45) Date of Patent: Dec. 19, 2017

(54) DEVICE FOR LIQUID DEGASSING

(71) Applicant: EAST CHINA UNIVERSITY OF SCIENCE AND TECHNOLOGY, Shanghai (CN)

(72) Inventors: Qiang Yang, Shanghai (CN); Xiao Xu, Shanghai (CN); Hao Lu, Shanghai (CN); Chaoyang Wang, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 146 days.

(21) Appl. No.: 14/764,179

(22) PCT Filed: Jan. 10, 2014

(86) PCT No.: PCT/CN2014/000028
§ 371 (c)(1),
(2) Date: Oct. 14, 2015

(87) PCT Pub. No.: WO2014/117632
PCT Pub. Date: Aug. 7, 2014

(65) Prior Publication Data
US 2016/0082366 A1 Mar. 24, 2016

(30) Foreign Application Priority Data
Jan. 30, 2013 (CN) .......................... 2013 1 0037577

(51) Int. Cl.
*B01D 19/00* (2006.01)

(52) U.S. Cl.
CPC ..... *B01D 19/0052* (2013.01); *B01D 19/0036* (2013.01); *B01D 19/0057* (2013.01)

(58) Field of Classification Search
None
See application file for complete search history.

(56) References Cited

U.S. PATENT DOCUMENTS

| 7,651,621 B2 * | 1/2010 | Kelsey | B01D 19/0005 210/739 |
| 2007/0084340 A1 * | 4/2007 | Dou | B01D 19/0057 95/8 |

(Continued)

FOREIGN PATENT DOCUMENTS

| CN | 201643885 U | * 11/2010 |
| CN | 202376859 U | * 8/2012 |

OTHER PUBLICATIONS

Translation of CN201643885U, accessed Apr. 12, 2017.*
Translation of CN202376859U, accessed Apr. 12, 2017.*

*Primary Examiner* — Amber R Orlando
*Assistant Examiner* — Phillip Shao
(74) *Attorney, Agent, or Firm* — Kening Li; Miller Canfield

(57) ABSTRACT

The present invention relates to a device for liquid degassing by means of swirling or centrifugal force coupled with a pressure gradient. This device comprises a cavity. The cavity is furnished with an inlet for liquid-gas mixture, a gas outlet and a liquid outlet. The gas outlet is inserted into the cavity through the top end of the cavity and positioned around 0.1-3 times the maximum diameter of the cavity from the top of the cavity. Specifically, an overflow pipe with the diameter gradually increasing from the bottom to the top was used as the gas outlet. The overflow pipe is further furnished with a bell mouth at the bottom part.

5 Claims, 2 Drawing Sheets

(56) References Cited

U.S. PATENT DOCUMENTS

| | | | |
|---|---|---|---|
| 2008/0006588 A1* | 1/2008 | Movafaghian | B01D 17/0217 210/788 |
| 2009/0165654 A1* | 7/2009 | Koenig | B01D 19/0094 96/175 |
| 2010/0269696 A1* | 10/2010 | Sarshar | B01D 17/0217 95/243 |

* cited by examiner

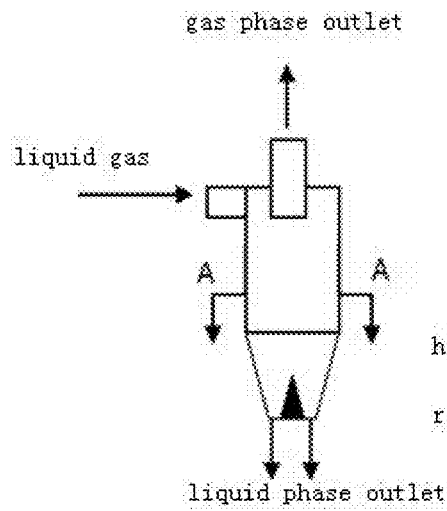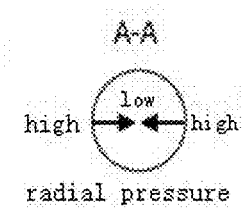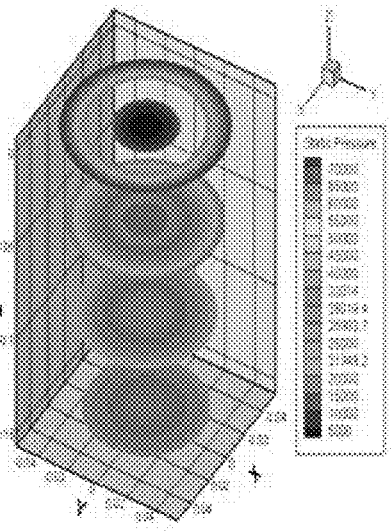
Fig. 3-1　　　　Fig. 3-2　　　　Fig. 3-3
Fig. 3
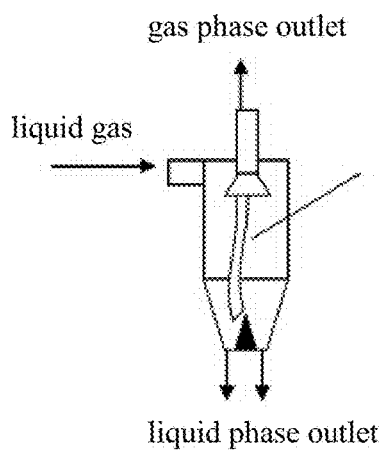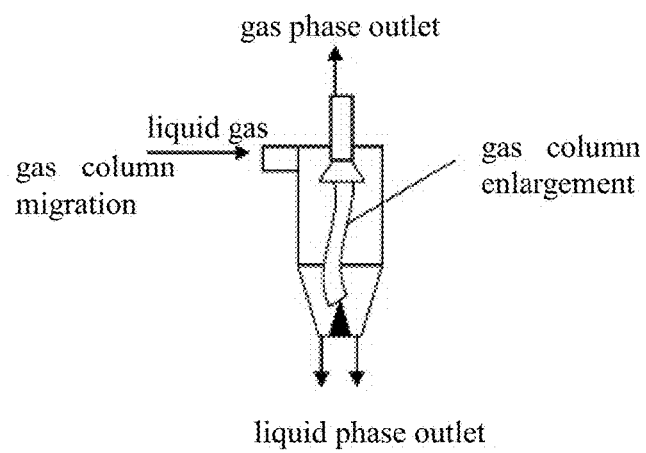
Fig. 4-1　　　　　　　　Fig. 4-2
Fig. 4

DEVICE FOR LIQUID DEGASSING

TECHNICAL FIELD

The present invention relates to a liquid degassing apparatus, in particular, relates to a device by means of swirling or centrifugal force coupled with a pressure gradient to carry out liquid degassing.

TECHNICAL BACKGROUND

There are a large number of liquid degassing processes in the petroleum chemical industry, coal chemical industry, food, water treatment, oil and other industries. Efficient and economical degassing technology plays an important role in the efficient, safe and long-termoperation of the device. In the petrochemical industry, the release of dissolved gas from liquid due to pipe pressure drop in the pressurized liquid delivery process may cause air resistance, local corrosion and other issues. In the food industry, dissolved gases affect the purity of the products, and lead to the quality problems. The existence of dissolved oxygen in water treatment process is the main reason for the corrosion of the thermal equipment (such as steam turbine, etc.), resulting in the oxygen corrosion of the boiler during operation and out of operation. The dissolved gas in the fine chemical industry can cause bubbles defects in products. Therefore, liquid degassing technology is widely used in the process industry, and plays an important role.

At present, the main technology of liquid degassing is divided into two kinds: physical or chemical. The principle of the physical method is Henry's Law (the solubility of gas in water is directly proportional to the partial pressure of the gas at the surface of the solution) and that of Dalton's partial pressure law (The partial pressure of various components in a mixed gas is proportional to the its mole fraction). By changing the partial pressure and gas component content, the dissolved gas in the liquid is removed. Physical methods include air blast vacuum and membrane separation technology. In chemical methods, adsorption materials are added into the liquid, and dissolved gas is removed by reacting with the adsorbent material in the liquid under partial pressure. The blast type, and vacuum type technology has certain application limitations because of large area requirement, relatively high operating costs. The need to use blowers, vacuum pumps and degassing tower (tank) or combination thereof limits its use to substantially atmospheric or low pressure conditions. Membrane separation is carried out by the pressure difference between the inside and outside of a membrane. Gas can be passed through the membrane and the liquid cannot. Membrane separation technology is not suitable for the degassing process of high-pressure liquid containing solid impurities. In recent years, with the continuous progress of science and technology, a method has been developed by using ultrasonic wave and swirling technology to carry out the degassing. Ultrasound technology uses the hole effect of ultrasonic vibration. The diameter of and the rising rate of the micro-bubbles in the fluid increase, and finally rise to the surface, discharged from the exhaust port, eliminating tiny bubbles in the fluid. Swirling technology realizes the removal of trace gases in liquid by the use of liquid-gas two-phase density difference in a centrifugal field.

In comparison, the swirling degassing technology can be applied in solids-containing liquid degassing and high-pressure degassing processes. The researchers through extensore research have also invented a number of three-phase separators applied in the separation of sand and swirling degassing from crude oil in the field of oil production processes, and the use of a certain structure to enhance the effect of swirling degassing, such as the use of inverted cone structure to optimize the structure of the swirling degassing device, etc. (Zhang Yujie, Jiang Minghu, Zhao Lixin et al. Flow field analysis and structure optimization of three phase separator based on CID. Chemical engineering machinery, 2010; Liu Xiaomin, Jiang Minghu, Zhao Lixin et al. Development and feasibility test of gas—liquid swirling separation device. Fluid machinery, 2004; Wang Hanlun, Chang Zheng, Xu Lei et al. Study on pressure characteristics and separation characteristics of the integrated swirler with degassing and removal of sand, chemical equipment technology. 2010; Jiang Minghu, Han dragon, Zhao Lixin et al. Study on separation performance of inner cone type three phase swirling separator. Chemical machinery. 2011). Because swirling degassing is bared on by the principle of liquid-gas two-phase density difference, the change of the flow field in the swirling degasser has a great influence on the variation of centrifugal field, thereby affecting the degassing efficiency. For example, the fluctuation of inlet flow can cause the change in the size of the centrifugal field, and the change of operation conditions such as the change of inlet air volume can affect the thickness of the air column in the swirler. For a given overflow outlet size, the change of the diameter of the air column will directly result in a large amount of liquid carried in the outlet for gas or gas carried in the outlet for liquid, requiring a second separation after the separation by the separator. FIG. 2 is a schematic diagram of the structure of the conventional swirling degassing device. When the flow rate of inlet is low and the centrifugal field is also low, the gas column diameter is smaller than that of the overflow port, and the outlet for gas phase can carry a large amount of liquid. Similarly, the flow rate of inlet is constant, and the entrainment of inlet gas is reduced, which also has the problem. When the flow rate of the inlet increases or the inlet gas content increases, it will lead to the increase of gas column diameter, which results in the reduction of gas phase separation efficiency and other issues. On the other hand, researchers have discovered that conventional technology is suitable only for the working conditions of trace gas carried in the liquid, and does not perform well in conditions of a large amount of gas carried in the liquid.

SUMMARY OF INVENTION

In order to overcome the disadvantages mentioned above, the present invention provides a device for efficient liquid degassing by means of swirling or centrifugal force coupled with a pressure gradient.

Specific Embodiments

A device for liquid degassing by means of swirling or centrifugal force coupled with a pressure gradient, comprising a vertical cavity, wherein the cavity comprises a top end and a bottom end, has a maximum diameter and is furnished with an inlet for liquid-gas mixture, a gas outlet and a liquid outlet, wherein the gas outlet is inserted into the cavity through the top end of the cavity and positioned around 0.1-3 times the maximum diameter of the cavity from the top of the cavity.

Furthermore, the cavity comprises a column-shaped segment and a frustum-shaped segment beneath and connected to the column-shaped segment via its larger base, wherein the diameter of the larger base of the frustum-shaped segment is the same as the diameter of the column-shaped segment.

Furthermore, the gas outlet is an overflow pipe, wherein the flow passage of the overflow pipe is an ejection pipe with an increasing diameter from bottom to top.

Furthermore, the overflow pipe is connected to a second overflow pipe at its top, and the second overflow pipe is furnished with a circular groove gap.

Furthermore, the device is furnished with a barrel body which surrounds the overflow pipe to form a closed cavity, wherein the closed cavity is furnished with an outlet for the secondary fluid at its bottom.

Furthermore, a bell mouth section is arranged at the bottom of the overflow pipe that is inserted into the cavity.

Furthermore, the bottom of the overflow pipe that is inserted into the cavity has a thick wall, configured in such a way that the exterior of the bottom of the overflow pipe forms an inverted frustum, and the inlet for liquid-gas mixture is disposed at a higher position than the bottom edge of the thick wall of the inverted frustum.

Furthermore, the bottom end of the vertical cavity is furnished with an endocone, wherein the bottom cross section area of the endocone is larger than the cross section area of the bottom of the gas outlet that is inserted into the cavity.

Furthermore, the liquid inlet is tangent type, and the bottom of the liquid inlet is even with the bottom of the endocone.

Furthermore, the inlet for liquid-gas mixture can be axial flow type, tangent, screw or involute type.

The advantages of the current invention are as follows. The present invention designs an inverted frustum-shaped gas outlet which is inserted into the vertical cavity. The present invention takes full advantage of the impact of pressure gradient within the cavity on the solubility of gas in liquid and uses the centrifugal force together with the pressure gradient to remove the gas carried in the liquid while the gas dissolved in liquid under pressure at the inlet is also removed. The present invention further optimizes the structure of the gas outlet. The gas outlet is furnished with a circular groove gap and a thick wall, which solves the low removal efficiency problems caused by the fluctuating operating conditions at the inlet, avoids secondary separation which is performed by other equipment set at the gas outlet, and also increases pressure of the discharged gas. The device of the present invention has a simple structure and can be widely used.

BRIEF DESCRIPTION OF THE DRAWINGS

FIG. 3 is a schematic diagram showing the pressure gradient distributed in degassing device of the present invention. FIG. 3-1 is a schematic diagram of the structure of the degassing device. FIG. 3-2 is a radial diagram showing the pressure at the cross section taken along line A-A. FIG. 3-3 is a diagram showing the simulated pressure gradient distribution at the radial section of the degassing device.

FIG. 4 is the schematic diagram showing the migration and enlargement of gas flow in the device of the present invention.

REFERENCE NUMERAL

Figure 1:
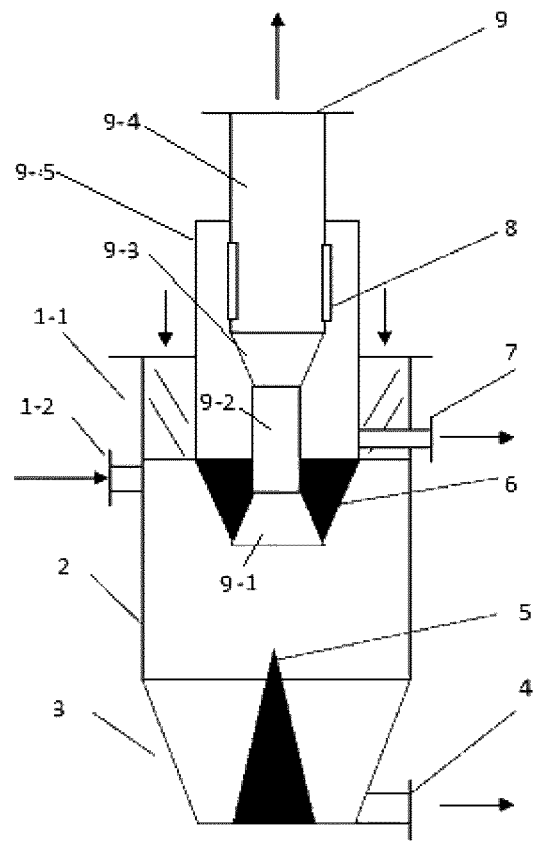
FIG. 1 is a schematic diagram showing the structure of the device of the present invention.
Figure 2:
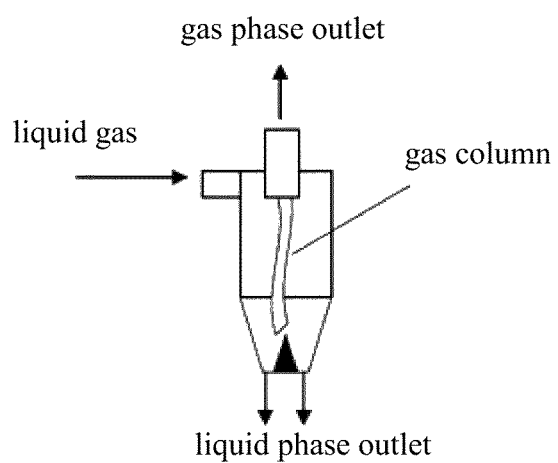
FIG. 2 is a schematic diagram showing the structure of the swirling degassing device in the prior art.

1-1 axial flow inlet for liquid-gas mixture
1-2 tangential inlet for liquid-gas mixture
2 column-shaped segment
3 frustum-shaped segment
4 liquid outlet
5 endocone
6 thick wall
7 outlet for the secondary fluid
8 circular groove gap
9 secondary separation jet overflow pipe
9-1 bell mouth section
9-2 column section
9-3 inverted frustum-shaped connection section
9-4 a second overflow pipe
9-5 barrel body

DETAILED DESCRIPTION OF THE INVENTION

Please refer to FIG. 3. The inventor of the current invention found an obvious pressure gradient at the radial cross section positioned 0.5-3 times the diameter of the column-shaped segment from the top of the cavity. In other words, the pressure at the cross section decreased inwards radially. According to Henry law, at a height close to the cross section, the pressure at the outside wall of the swirler was high whereas the central pressure was low. The gas dissolved under the pressure around the outside wall may migrate to the central position. To position the gas outlet at central part can further remove the gas dissolved in liquid under the pressure at the inlet. When the centrifugal force in the degassing technology by means of swirling was combined with the pressure gradient, in addition to the gas carried in liquid, the gas dissolved in the liquid under the pressure at the inlet can be removed.

FIG. 1 was a schematic diagram showing the structure of the device of the present invention for efficient liquid degassing by means of swirling or centrifugal force coupled with a pressure gradient. The device contained a frustum-shaped segment 3 (which can also be a column-shaped segment) at the bottom and a column-shaped segment 2 above and connected to the frustum-shaped segment, wherein the diameter of the larger base of the frustum-shaped was identical to the diameter of the column-shaped segment. The frustum-shaped segment 3 and the column-shaped segment 2 formed a closed cavity. The closed cavity was furnished at the bottom with a liquid outlet 4. The upper part of the closed cavity was furnished with an inlet for liquid-gas mixture and a gas outlet, wherein the gas outlet was inserted into the closed cavity from the top end and positioned at the center of the radial cross section around 0.1-3 times the maximum diameter of the cavity from the top of the cavity. The gas outlet had a shape of an inverted bell, wherein its end cross section faces the center of the radial cross section having the lowest pressure so as to collect the gas emitted due to the low pressure at the center. A secondary separation jet overflow pipe 9 was used as the gas outlet. As shown in the figure, the secondary separation jet overflow pipe 9 was located at the central axis of the column-shaped segment 2, and contained a bell mouth section 9-1, a column section 9-2, an inverted frustum-shaped connection section 9-3, a second overflow pipe 9-4, wherein the four sections formed an overflow cavity with the radius being decreased and then increased, which can increase the pressure at the gas outlet while increasing the gas collecting area and also the gas collecting efficiency. The second overflow pipe 9-4 was furnished with a circular groove gap 8 at its periphery. The circular groove gap 8 was surrounded by a barrel body 9-5, which enclosed the overflow cavity to form a closed cavity. The barrel body 9-5 was furnished with an outlet for secondary fluid 7 at its bottom, which was inside the second overflow pipe 9-4 to remove the liquid carried in the gas effectively using the centrifugal force. This ensured an effective separation of the liquid from the gas, which avoided secondary separation. A bell mouth section 9-1 was disposed below the column section 9-2, in order to catch gas to a maximum extent. The bell mouth 9-1 had a thick wall 6 which extended from the bell mouth section 9-1 to the top end of the column-shaped segment 2, in order to guide the liquid or gas which entered from the inlet located at the upper part or top of the cavity into the area with pressure gradient and to facilitate liquid-gas separation. The inlet for liquid-gas mixture can be tangent, axial flow type, or screw type. The column-shaped segment 2 was furnished with an endocone 5. The bottom surface area of the endocone 5 was larger than the bottom cross section area of the bell mouth section 9-1, in order to reduce the gas carried in the liquid.

FIG. 4 was the schematic diagram showing the migration and enlargement of gas flow in the present invention. The present invention used a combination of the thick wall 6 and the secondary separation jet overflow pipe 9 to greatly increase the gas capture efficiency. When the gas flow fluctuated, for example, the gas flow deviated from the center or the gas flow was enlarged, the device can still efficiently discharge gas from the gas outlet and broaden the range of gas-liquid volume ratio at the inlet, i.e., 0% to 50% all worked. When a small volume of gas was introduced or the operation fluctuation occurred, liquid would be carried out through the gas outlet with gas. The liquid carried in the gas would be effectively removed by using the centrifugal force through the circular groove gap 8 arranged on the second overflow pipe 9-4. It avoided the establishment of the secondary separation equipment outside the swirling degasser which was used to further separate the liquid entrained with the gas.

The device can be used with the following process. A liquid containing 0-50% of gas by volume (also referred to as a liquid-gas mixture) entered the device under certain pressure from an axial flow type inlet 1-1 or a tangential inlet 1-2. The liquid-gas mixture converted a portion of the potential energy to centrifugal force. Under the action of the centrifugal force, the gas carried in the liquid was moved to the center of the column-shaped segment 2. The gas dissolved in the liquid at the inlet under the partial pressure was moved to the central axis of the device (where the secondary separation jet overflow pipe 9 was arranged) under the action of the pressure gradient, and mixed with the gas isolated with the centrifugal force at the cross-section of the bell mouth disposed at the end of the overflow pipe and then exported through the secondary separation jet overflow pipe 9. The liquid carried in the exported gas was subject to secondary separation through the circular groove gap 8 of the secondary separation jet overflow pipe 9. The purified gas was discharged from the opening in the upper part of the second overflow pipe 9-4. The liquid recovered in the secondary separation was discharged through the outlet for the secondary fluid 7. The purified liquid without gas was discharged from the liquid outlet 4.

In summary, the preferred embodiment was described above, which does not limit the scope of the present invention. Equivalent changes and modifications to the descriptions of the present invention application are within the scope of the present invention.

What is claimed is:

1. A device for liquid degassing by means of swirling or centrifugal force coupled with a pressure gradient, comprising a vertical cavity, wherein the cavity comprises a top end and a bottom end, has a maximum diameter and is furnished with an inlet for a liquid-gas mixture, a gas outlet and a liquid outlet, wherein the gas outlet is realized through an overflow pipe inserted into the cavity through the top end of the cavity, and positioned around 0.1-3 times the maximum diameter of the cavity from the top of the cavity,
    wherein the cavity comprises a column-shaped segment, and a frustum-shaped segment beneath and connected to the column-shaped cavity via its larger base, wherein the diameter of the larger base of the frustum-shaped segment is the same as the diameter of the column-shaped segment,
    wherein the overflow pipe comprises, from the bottom to top, (i) a bell mouth section with a frustum-shaped internal cavity, (ii) a column section connected to the narrow end of the open mouth section, and (iii) an inverted frustum-shaped connection section connected to column section at its narrow end,
    wherein the bell mouth section has a thick wall, configured in such a way that the exterior of the bottom of the overflow pipe forms an inverted frustum and tapers toward the gas-phase outlet opening,
    wherein the overflow pipe is connected to a second overflow pipe through the wide end of the inverted frustum-shaped connection section,
    wherein a barrel body encloses the overflow pipe and at least part of the second over flow pipe, and
    wherein the bottom end of vertical cavity is furnished with an endocone whose bottom cross section area is larger than the cross section area of the gas outlet.

2. The device according to claim 1, wherein the second overflow pipe is furnished with a circular groove gap.

3. The device according to claim 1, wherein the barrel body surrounds the overflow pipe to form a closed cavity, wherein the closed cavity is furnished with an outlet for the secondary fluid at its bottom.

4. The device according to claim 1, wherein the liquid outlet is tangent type; and the bottom of liquid outlet is even with the bottom of the endocone.

5. The device according to claim 1 wherein the inlet for liquid and gas can be axial flow type, tangent, screw or involute type.

* * * * *